April 14, 1964   J. R. LUDWIG   3,128,862
CLUTCH DRIVE DISK POSITIONING DEVICE
Filed Oct. 14, 1960   2 Sheets-Sheet 1

*INVENTOR.*
JOHN ROBERT LUDWIG
BY Walter E. Pavlick

ATTORNEY

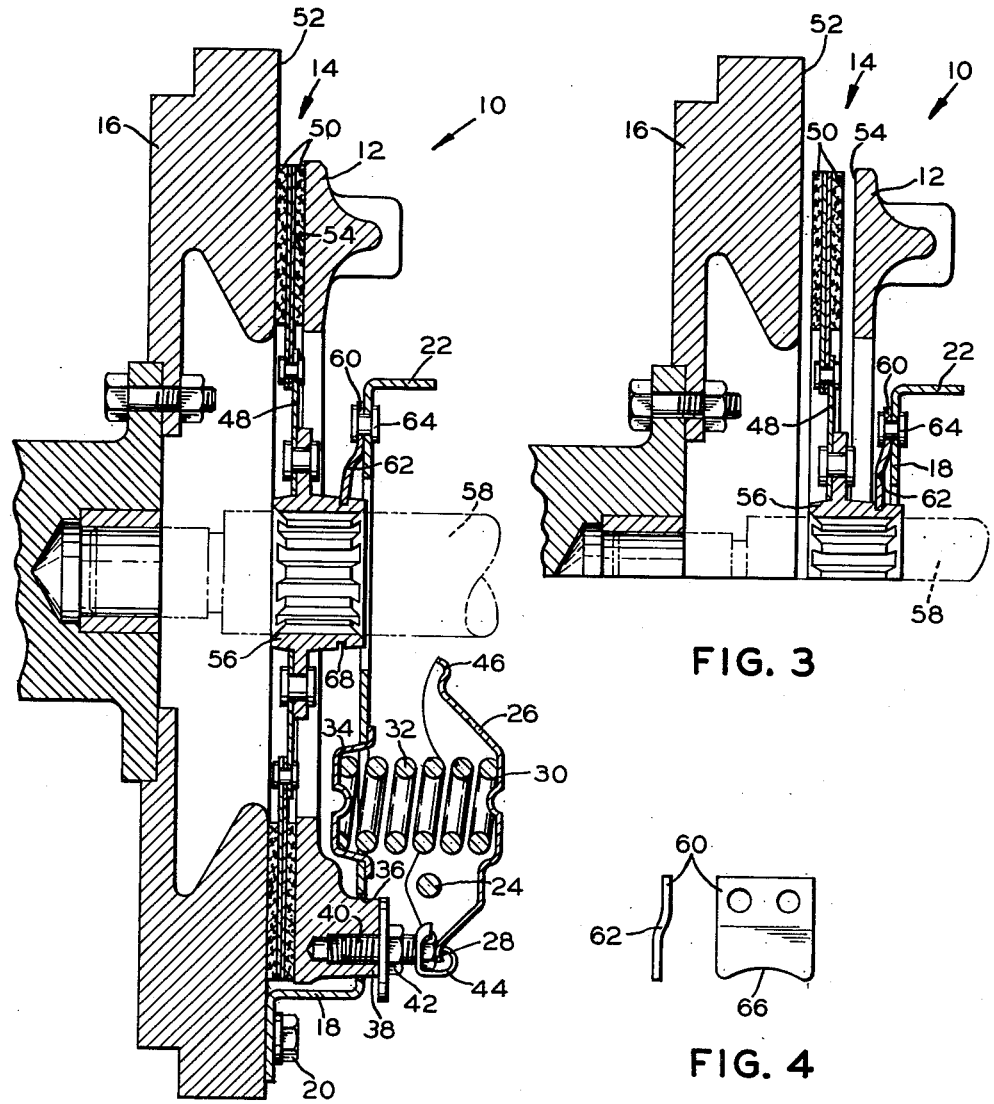

United States Patent Office 3,128,862
Patented Apr. 14, 1964

3,128,862
CLUTCH DRIVE DISK POSITIONING DEVICE
John Robert Ludwig, Swanton, Ohio, assignor to Dana Corporation, Toledo, Ohio, a corporation of Virginia
Filed Oct. 14, 1960, Ser. No. 62,737
6 Claims. (Cl. 192—68)

This invention relates to friction clutches in general, and is particularly directed to means adapted to position the driven element thereof between the driving element and its cooperating pressure plate.

Friction clutches, as used with automotive vehicle engines, generally employ a pressure plate drivingly connected to the engine flywheel and axially movable relative thereto to frictionally engage a driven element to the flywheel for transmitting drive torque from the engine to the input shaft of a transmission. The pressure plate is usually retracted by a suitable mechanical linkage to interrupt the transmission of power by the clutch assembly. This mechanical linkage permits only a limited amount of relative axial movement between the back face of the flywheel and the front face of the pressure plate.

When the usual clutch is disengaged, the driven member is axially free floating since the pressure plate is retracted from the driven member and no other axial positioning means operates on the driven member. It is during this phase of the clutch operation that an undesirable condition exists; that is, instead of being entirely free from contact with the pressure plate and the flywheel, the axially free floating driven member, due to unbalance of the clutch, driving or driven members or due to vibrations etc., may remain or be urged into engagement with the flywheel or pressure plate. Since the driven member is rotatable relative to the flywheel and pressure plate when disengaged, this undesired engagement results in a rubbing condition which tends to rotate the driven element as well as cause undue wear thereof by suffing and abrasion.

A primary object of this invention is, therefore, to provide a clutch mechanism of the type described wherein the driven element is biased out of engagement with both the engine flywheel and the pressure plate when the pressure plate is in its retracted position.

A further object of this invention is to provide a device which can be added to present clutch structures with a minimum amount of alterations thereto.

A still further object of this invention is to provide a device which is simple in construction, efficient in operation, inexpensive to assemble and manufacture, and occupies a minimum of space.

Further objects and advantages will become apparent upon reading the following specification, together with the accompanying drawings which form a part hereof.

In the drawings:

FIG. 2 is a sectional view taken substantially along line 2—2 of FIG. 1 showing the clutch in its normally engaged position;

FIG. 3 is a sectional view, similar to FIG. 2, showing the driven element biased to a neutral position between the flywheel and the pressure plate with the pressure plate in its retracted position; and FIG. 4 is a view of the resilient biasing means removed from the clutch shown in FIG. 1.

Figure 1:
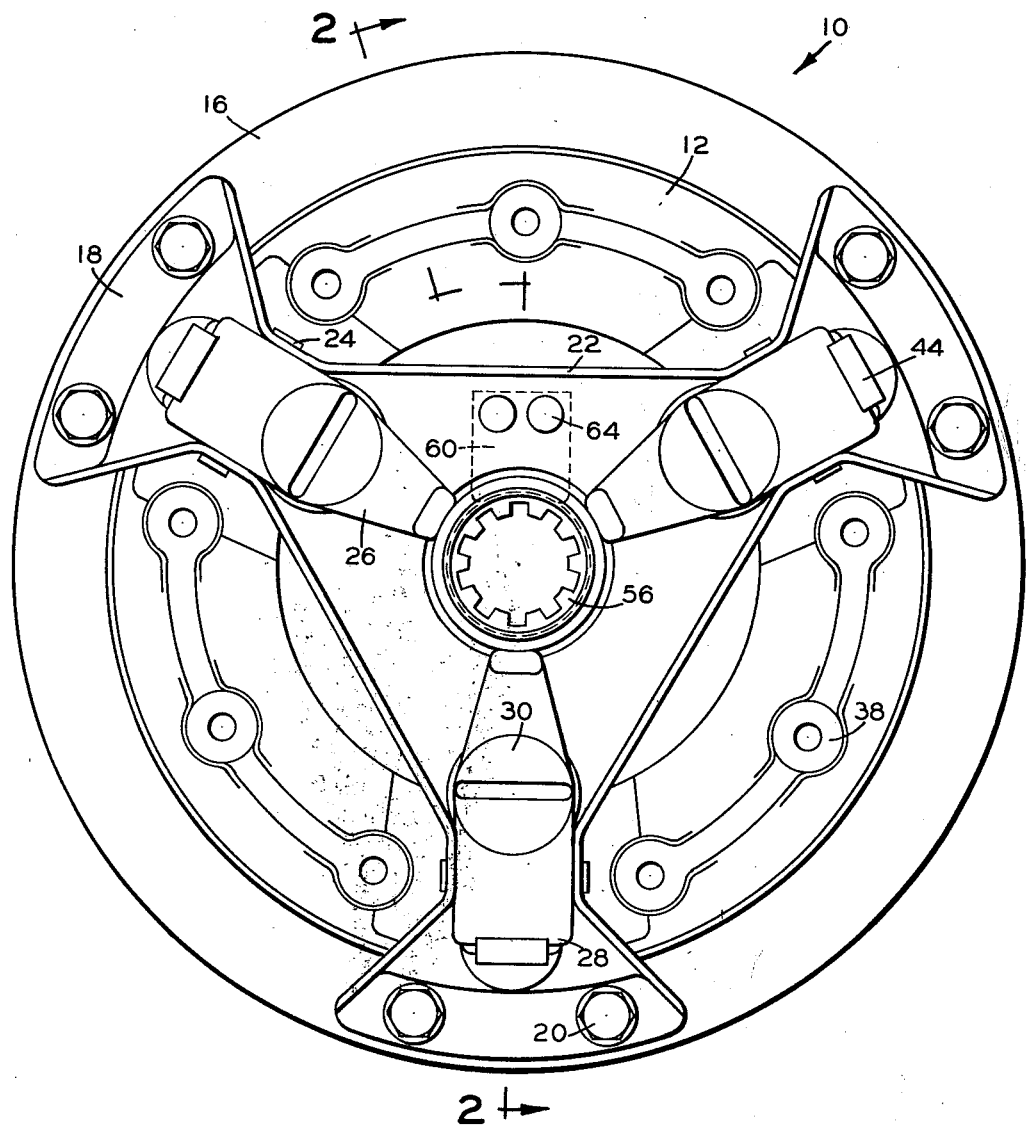
FIG. 1 is a rear view of a clutch showing the preferred embodiment of this invention.

Generally, the invention comprises a conventional friction clutch as shown (for example) in Thelander's Patent 2,724,475, issued on November 22, 1955, which is provided with a novel structure for positioning the driven element relative to the engine flywheel and the pressure plate. This novel structure comprises resilient means adapted to bias the driven element of the clutch to a neutral position between the flywheel and the pressure plate when the pressure plate is moved axially away from the flywheel.

Referring more particularly to the drawings, the clutch device indicated generally at 10 comprises a pressure plate 12 which is adapted to compress a driven disk assembly 14 against a flywheel 16.

The flywheel 16 is generally annular in configuration and is mounted on the rear end of the conventional engine crankshaft to form the driving element of the clutch device 10. A three-fingered supporting structure or back plate 18 is rigidly mounted for rotation with the engine flywheel 16 by means of cap screws 20. The supporting structure 18 is provided with spaced axially extending flanges 22 which mount a plurality of cross pins 24. A release lever 26 is pivotally mounted near its outer end 28 on each cross pin 24. The release levers 26 are provided with centrally disposed embossed portions 30 each of which receives one end of a coil spring 32. The other end of each coil spring 32 is positioned within a sheet metal cup 34 disposed in openings in the supporting structure adjacent each finger thereof. An opening 36 is spaced radially outwardly in the supporting structure 18 from each sheet metal cup 34 and receives an axially extending drive lug 38 provided on the pressure plate 12. Each drive lug 38 is provided with a bore which threadedly receives a set screw 40. The set screws 40 are adjusted to their desired position and locked in place by nuts 42. The heads of the set screws 40 bear against the outer ends 28 of the release levers 26 and are connected thereto by spring clips 44.

It is now apparent that coil springs 32 bias the release levers 26 to pivot about cross pins 24 and move the pressure plate 12 to compress the friction disk assembly 14 against the flywheel 16. The release levers 26 are arranged to be depressed against the action of the compression springs 32 by the operation of a throw-out bearing (not shown) against the inner ends 46 of the levers 26.

The driven disk assembly 14 is generally conventional in nature and comprises a friction disk 48 having the usual friction facings 50 which are adapted to engage the back face 52 of the flywheel 16 and the front face 54 of the pressure plate 12. The friction disk 48 is carried by a splined hub 56 which is movably mounted on the front end of a shaft 58 which extends rearwardly from the clutch device 10 into the transmission gear box (not shown).

Means is provided to bias the driven disk assembly 14 to a neutral position between the flywheel 16 and the pressure plate 12 when the pressure plate is moved axially away from the flywheel. More particularly, a generally rectangular shaped leaf spring 60 having a curved portion 62 longitudinally intermediate its ends is fixedly secured by means of rivets 64 at one end thereof to the support structure or backing plate 18. The leaf spring 60 extends generally radially inwardly and terminates in an arcuate portion 66 which is seated in an annular groove 68 provided in the periphery of the hub 56 of the driven disk assembly 14.

In operation, the coil springs 32 normally bias the release levers 26 about cross pins 24 to move the pressure plate 12 and compress the driven disk assembly 14 against the flywheel 16 as shown in FIG. 2. Since the coil springs 32 provide a much greater bias than the leaf spring 60, the leaf spring does not interfere with this clutch engaging action. However, when the release levers 26 are depressed and the coil springs 32 are accordingly compressed between the levers 26 and the sheet metal cups 34 provided in the supporting structure 18, the pressure plate 12 is retracted from the flywheel 16. As the pressure plate 12 is moved away from the flywheel 16, the leaf spring 60 biases the driven disk assembly 14 to a neutral position as shown in FIG. 3 between the flywheel 16 and the pressure plate 12. Since the leaf spring 60 positively centers the driven disk assembly 14 between the flywheel and the pressure plate, it is apparent that scuffing, abrasion, and the resultant wear on the friction facings 50 due to torsional disturbances and bending of the engine crankshaft etc. will be greatly reduced.

It is obvious that various changes in the details, which have been described and illustrated in order to explain the nature of this invention, may be made by those skilled in the art within the principles and scope of this invention as expressed in the appended claims.

What is claimed is:

1. In a friction clutch the combination comprising a driving element, a driven element, a pressure plate movable to cause engagement of said driving and driven elements, means for retracting said pressure plate to cause disengagement of said driving and driven elements and resilient means carried by said driving element for biasing the driven element away from said driving element and away from said pressure plate to a neutral position between the driving element and the pressure plate upon movement of the pressure plate to its retracted position.

2. In a clutch having a flywheel the combination comprising support means adapted to be connected to the flywheel, a driven element adapted to be movable into engagement with the flywheel, a pressure plate carried by said support means and movable axially to cause engagement of said driven element with the flywheel, and means carried by said support means for biasing said driven element to a neutral position between said pressure plate and the flywheel upon movement of the pressure plate away from said flywheel.

3. In a clutch having a driving element the combination comprising support means adapted to be connected to the driving element, a driven element adapted to be frictionally engageable with the driving element and including a hub portion, a pressure plate carried by said support means and movable axially to cause engagement of said driven element with the driving element, and means carried by said support means and engaging said hub member for biasing the same to a neutral position to position said driven element when said pressure plate is disengaged from said driven element.

4. In a clutch having a flywheel the combination comprising support means adapted to be connected to the flywheel, a driven element adapted to be frictionally engageable with the flywheel and including a hub portion having an annular groove, a pressure plate carried by said support means and movable axially to cause engagement of said driven element with the flywheel, and resilient means carried by said support means and cooperating with said groove in the hub portion to position said driven element in a neutral position when said pressure plate is disengaged from said driven element.

5. The combination defined in claim 4 wherein said resilient means comprises a leaf spring secured at one end to said support means and has the other end seated in said annular groove.

6. A clutch comprising a flywheel, a supporting structure rigidly secured to said flywheel, a driven element adapted to be frictionally engageable with said flywheel and including a hub portion having an annular groove, a pressure plate movably carried by said support structure, lever means pivotally carried by said support structure and connected to said pressure plate, said lever means being operable to cause engagement and disengagement of the clutch, spring means compressed between said lever means and said support structure and normally biasing the clutch into engaged position, and a leaf spring having one end secured to said support structure and being curved intermediate its ends so that the other end is spaced axially from said support structure, said other end having an arcuate portion received in said groove in the hub portion of the driven element for positioning the driven element relative to said flywheel and said pressure plate upon disengagement of the clutch.

References Cited in the file of this patent

UNITED STATES PATENTS

| 1,239,940 | Murray | Sept. 11, 1917 |
| 2,236,652 | Shurts et al. | Apr. 1, 1941 |
| 2,589,308 | Thelander | Mar. 18, 1952 |
| 2,841,262 | Ziedler | July 1, 1958 |

FOREIGN PATENTS

| 526,533 | Belgium | Mar. 15, 1954 |